United States Patent [19]

Ueda et al.

[11] Patent Number: 4,863,811
[45] Date of Patent: Sep. 5, 1989

[54] MAGNETIC RECORDING MEDIUM AND METHOD OF MAKING

[75] Inventors: Kunihiro Ueda; Masatoshi Nakayama, both of Nagano, Japan

[73] Assignee: TDK Corporation, Tokyo, Japan

[21] Appl. No.: 44,744

[22] Filed: May 1, 1987

[30] Foreign Application Priority Data

May 2, 1986 [JP] Japan ................. 61-102856

[51] Int. Cl.⁴ ............................................. G11B 5/64
[52] U.S. Cl. ..................................... 428/694; 427/34; 427/41; 427/131; 427/132; 428/900
[58] Field of Search ................ 428/694, 900; 427/131, 427/132, 41, 54.1

[56] References Cited

U.S. PATENT DOCUMENTS

| | | | |
|---|---|---|---|
| 4,260,466 | 4/1981 | Shirahata et al. | 427/54.1 |
| 4,419,404 | 12/1983 | Arai et al. | 428/336 |
| 4,582,746 | 4/1986 | Shirahata et al. | 428/694 |
| 4,599,266 | 7/1986 | Nakayama et al. | 428/336 |
| 4,652,483 | 3/1987 | Arai et al. | 428/694 |
| 4,693,934 | 9/1987 | Nishimatsu et al. | 427/131 |

FOREIGN PATENT DOCUMENTS 0047321 8/1985 European Pat. Off. .

Primary Examiner—Paul J. Thibodeau
Attorney, Agent, or Firm—Oblon, Spivak, McClelland, Maier & Neustadt

[57] ABSTRACT

A magnetic recording medium comprising a substrate and a continuous thin film magnetic layer on the substrate is prevented from curling or cupping by incorporating a polymeric organic compound in the magnetic layer. An organic compound is introduced into the magnetic layer during its formation and polymerized with the aid of plasma or radiation. A topcoat is formed on the magnetic layer by plasma polymerizing an organic compound for further improvement.

8 Claims, 2 Drawing Sheets

MAGNETIC RECORDING MEDIUM AND METHOD OF MAKING

BACKGROUND OF THE INVENTION

This invention relates to magnetic recording media, and more particularly, to magnetic recording media having a magnetic layer of the continuous metal thin film type as well as a method for making same.

Among magnetic recording media for use in video, audio and other applications, active research and development work has been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process in which cobalt and optional elements are evaporated and directed at a predetermined angle with respect to the normal to the substrate because such evaporated films exhibit superior characteristics. The evaporated magnetic layers are, however, prone to oxidation with time and hence rusting, incurring many performance losses including reduced output and runnability (that is, the durability of tape which travels in frictional contact with rigid members in a video equipment). The media suffer from poor head contact and output variations due to curling or cupping thereof.

Great efforts have been made to overcome the problem. One typical attempt is the provision of a plasma-polymerized film on the magnetic layer as disclosed in Japanese Patent Application Kokai Nos. 58-8828, 58-8829, 58-102330, 58-194131, 59-72653, 59-154641, 59-154643, and 59-160828. It is also proposed to oxidize the surface of the magnetic layer to produce a metal oxide region and forming a plasma-polymerized film thereon as disclosed in Japanese Patent Application Kokai No. 59-171028. These attempts are successful in improving the corrosion resistance and durability, but fail to provide fully satisfactory results in minimizing the output variation of the medium due to curling or cupping thereof. There is a need for further improvement in this respect.

SUMMARY OF THE INVENTION

An object of the present invention is to provide a novel and improved magnetic recording medium which is substantially free of curling or cupping and exhibits a minimized output variation as well as improved corrosion resistance and runnability.

Another object of the present invention is to provide a method for making such an improved magnetic recording medium.

According to a first aspect of the present invention there is provided a magnetic recording medium comprising a substrate and a continuous metal thin film magnetic layer on the substrate, wherein the magnetic layer contains a polymeric organic compound.

In one preferred embodiment, the magnetic layer contains cobalt in an atomic ratio of carbon to cobalt of from $10^{-8}$ to $10^{-2}$. Preferably the medium further comprises a topcoat layer on the magnetic layer.

According to a second aspect of the present invention, there is provided a method for preparing a magnetic recording medium according to the first aspect, comprising the steps of forming the magnetic layer while incorporating an organic compound therein, and polymerizing the organic compound.

In preferred embodiments, the organic compound is polymerized in a plasma atmosphere or through exposure to radiation. Preferably, the organic compound is incorporated in the magnetic layer before it is polymerized.

A magnetic recording medium comprising a substrate, a continuous metal thin film magnetic layer, and a topcoat layer is prepared by forming the magnetic layer while incorporating a first organic compound therein, depositing a second organic compound on the magnetic layer, and polymerizing the organic compounds.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
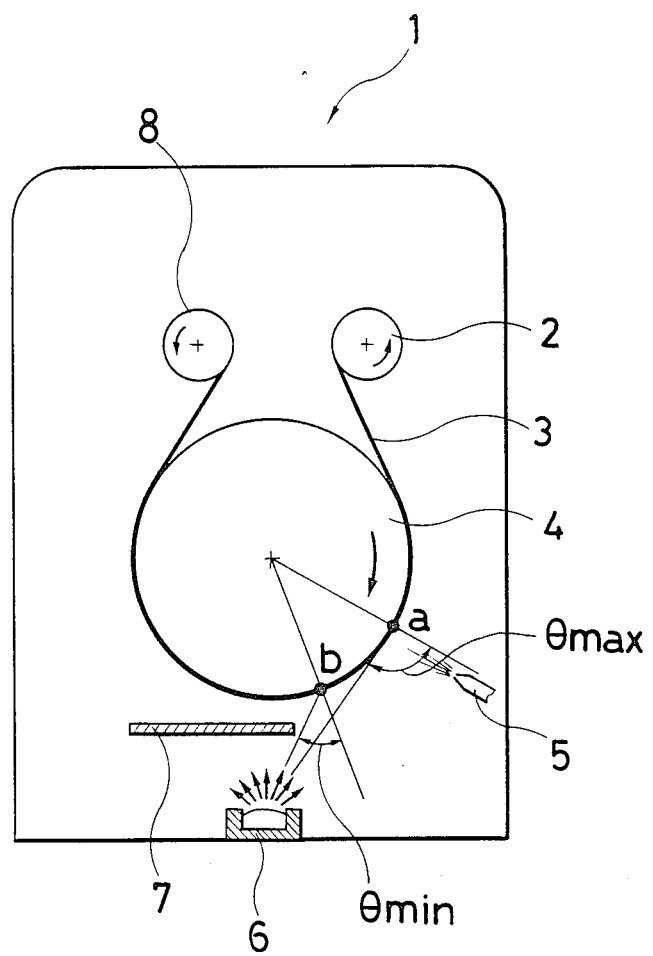
FIG. 1 is a schematic view of an evaporation apparatus for use in the preparation of a magnetic layer according to the present invention.

The magnetic recording medium of the present invention has a magnetic layer on one major surface of a substrate. The magnetic layer used herein is a continuous, preferably ferromagnetic, metal thin film coextending over the substrate and is generally comprised of a major or entire proportion of cobalt and/or nickel. In preferred embodiments of the present invention, the magnetic layer may consist essentially of cobalt; cobalt and nickel; cobalt and oxygen; and cobalt, nickel and oxygen. That is, the magnetic layer may consist essentially of cobalt alone or a mixture of cobalt and nickel. Where the layer consists essentially of cobalt and nickel, the weight ratio of Co/Ni may preferably be at least about 1.5.

Better results are obtained when the magnetic metal thin film layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. The weight ratio of Cr/Co (when nickel free) or Cr/(Co+Ni) is preferably in the range of about 0.001 to 0.1, and more preferably about 0.005 to 0.05.

The magnetic layer may further contain oxygen in addition to cobalt or cobalt and nickel. The presence of oxygen contributes to further improvements in electromagnetic characteristics and runnability. The atomic ratio of O/Co (when nickel free) or O/(Co+Ni) is preferably up to about 0.5, and more preferably from about 0.15 to 0.45.

The magnetic layer may further contain trace elements, particularly transition elements, for example, Fe, Mn, V, Zr, Nb, Ta, Ti, Zn, Mo, W, Cu, etc.

The magnetic layer is preferably a coalescence of Co base particles of columnar structure oriented oblique to the normal to the substrate. More specifically, the axis of particles of columnar structure is preferably oriented at an angle of about 20° to 60° with respect to the normal to the major surface of the substrate. Each columnar article generally extends throughout the thickness of the magnetic layer and has a breadth or minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. 0.05 to 0.5 μm, and preferably about 0.07 to 0.3 μm.

The magnetic layer may be formed on the substrate either directly or via an undercoat layer of the well-known type. Further, the magnetic layer is generally formed as a single layer, but in some cases, it may be made up from a plurality of laminated sub-layers with or without an intermediate nonmagnetic metal thin film layer interposed therebetween.

The magnetic layer or ferromagnetic metal thin film may be formed by any well-known techniques including electrodeposition, evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inert atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like without undue experimentation. For further information about the evaporation process, reference should be made to D. E. Speliotis et al., "Hard magnetic films of iron, cobalt and nickel", J. Appl. Phys., 36, 3,972 (1965) and Y. Maezawa et al., "Metal thin film video tape by vacuum deposition", IERE Conference Proceedings 54 (The Fourth International Conference on Video and Data Recording, The University of Southanmpton, Hampshire, England, 20-23 April, 1982), pp. 1-9. Post-treatments are well known in the art and any suitable ones may be selected therefrom. One effective post-treatment is a treatment for incorporating oxygen into the magnetic layer, which is also well known in the art.

The magnetic layer according to the present invention contains a polymeric organic compound. The organic polymer is present in the magnetic layer so as to fill in between columnar particles. The organic polymer is so dense as to prevent the columnar particles of the magnetic layer from being directly contacted by oxygen molecules in air.

The magnetic layer containing an organic polymer has an atomic ratio of carbon to cobalt (C/Co) in the range between $10^{-8}$ and $10^{-2}$. Outside the range, the output and coercive force of the magnetic layer are reduced and little improvement in corrosion resistance is observable. The C/Co atomic ratio of the magnetic layer may be readily determined by identifying the composition of the layer by Auger spectroscopy and SIMS (secondary ion mass spectroscopy).

The preferred organic polymers used herein are those containing carbon and hydrogen. The atomic ratio of carbon to hydrogen (C/H) preferably ranges from about 1:1 to about 6:1. Fluorine-containing polymers are also useful.

The organic polymer may be incorporated into the magnetic layer by the following, non-limiting method.

Figure 2:
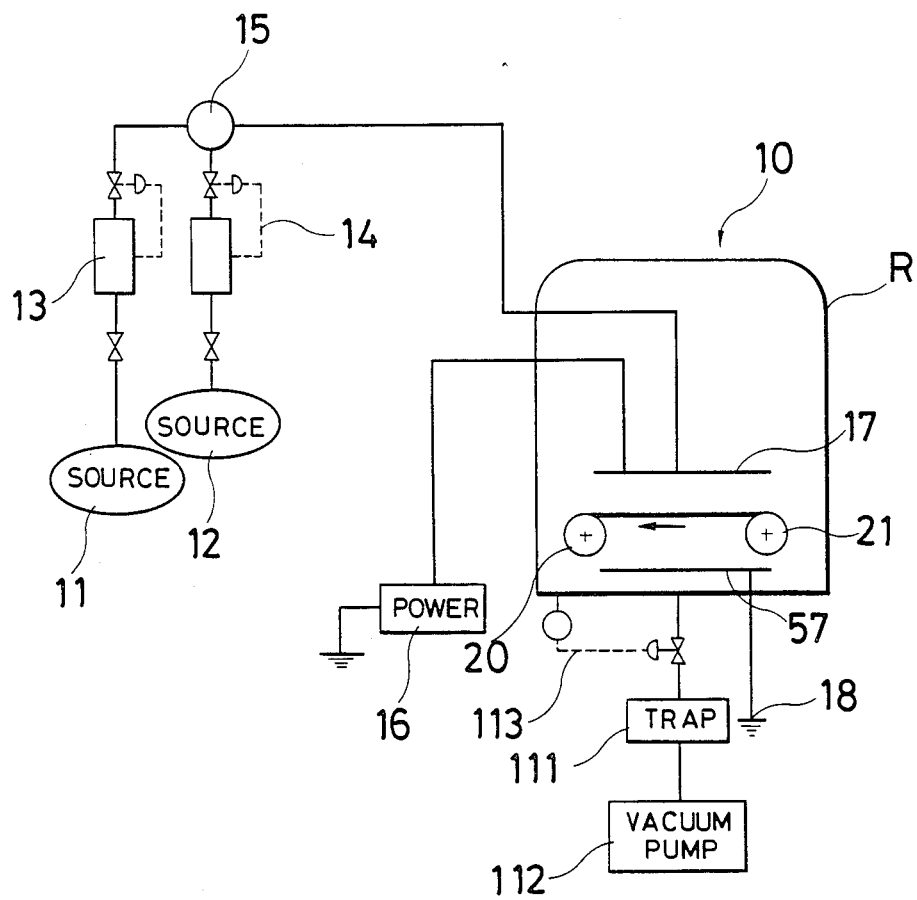
FIG. 2 is a schematic view of a plasma treating apparatus for use in the preparation of a magnetic recording medium according to the present invention.

Referring to FIGS. 1 and 2, there are illustrated apparatus for use in the preparation of the medium according to the present invention. FIG. 1 illustrates an evaporation apparatus for forming a magnetic layer while incorporating an organic compound therein. FIG. 2 illustrates a plasma processing apparatus as a typical apparatus for polymerizing the organic compound.

The evaporation apparatus generally designated at 1 in FIG. 1 include a housing for defining a vacuum chamber, a supply roll 2 having a substrate in the form of a length of web 3 wound thereon, a rotating cooling drum 4, and a take-up roll 8 for taking up the web 3. The web 3 is fed from the supply roll 2 to the take-up roll 8 via the cooling drum 4. Disposed in the chamber is a nozzle 5 for forming a jet of organic material gas toward the drum. The nozzle 5 is disposed and oriented so that the jet impinges the drum or web within a magnetic metal depositing region a-b as will be defined below. Disposed at the bottom of the chamber is an evaporation source in the form of a hearth 6 containing a magnetic metal material therein. A shield 7 is disposed between the drum 4 and the hearth 6.

Vapor metal material is evaporated from the hearth 6 and deposited on the web 3 at progressively varying incident angles from the maximum incident angle $\theta$max to the minimum incident angle $\theta$min, forming a magnetic layer. As seen from FIG. 1, the maximum incident angle $\theta$max is defined between a tangent from the hearth 6 to the circumference of the drum 4 and a radial line connecting the drum center and the tangential point a, and the minimum incident angle $\theta$min is defined between a line connecting the hearth 6 and the edge of the shield 7 and a radial line connecting the drum center and the crossing b between the line and the drum circumference. In the practice of the present invention, the organic material gas is ejected from the nozzle 5 during magnetic layer formation so that the organic material is incorporated in the magnetic layer being formed. The point of impingement of the jet of organic material gas on the web must fall within the region extending between the tangential point a and the crossing b.

The organic materials used herein are those organic compounds which become gaseous at a vacuum of about $10^{-5}$ Torr. Illustrative of the organic materials are (A) saturated or unsaturated hydrocarbons such as methane, ethane, propane, butane, pentane, ethylene, propylene, butene, butadiene, acetylene, methylacetylene, benzene, styrene, etc.;

(B) saturated or unsaturated fluorinated hydrocarbons such as fluoromethane, difluoromethane, trifluoromethane, difluoroethane, tetrafluoroethane, etc.;

(C) saturated or unsaturated fluorocarbons such as tetrafluoromethane, hexafluoroethane, octafluoropropane, octafluorocyclobutane, tetrafluoroethylene, hexafluoropropylene, etc.; and (D) other monomers such as methyl methacrylate, acrylic acid, vinyl chloride, vinylidene chloride, etc. Preferred among them are those having up to 3 carbon atoms such as methane, ethane, ethylene, acetylene, propane, propylene, methylacetylene, tetrafluoromethane, and tetrafluoroethylene. Generally, one compound selected from groups (A) to (D) may be used alone as a reactant gas although a mixture of two or more may be used. If desired, minor proportions of trace elements such as nitrogen, oxygen, boron and phosphorus may be added to the reactant.

The organic compound gas is introduced into the magnetic layer being formed within the magnetic metal depositing region a-b (see FIG. 1) so that evaporated particles of the organic compound may contact evaporated metal particles forming the magnetic layer. The flow rate of the organic compound gas may be properly chosen depending on the volume of the vacuum chamber and other factors although a flow rate of about 10 to 1,000 SCCM (standard cubic centimeter) is usually employed.

It should be understood that when the magnetic layer is formed by a method other than vacuum deposition, for example, by ion plating or sputtering, the above-mentioned technique for introducing the organic compound may be similarly applied without substantial modification.

The organic compound thus incorporated in the magnetic layer during its formation is then polymerized, for example, using a polymerizing apparatus. Polymerizing means installed in the polymerizing apparatus is not critical. Usually employed are (1) plasma means for effecting polymerization in a plasma atmosphere and (2) irradiation means for effecting polymerization by exposure to radiation such as electron radiation and ultraviolet radiation. It will be understood that when irradiation means is used for polymerization purpose, the organic compound incorporated in the magnetic layer is limited to those having a multiple bond such as ethylene, acetylene, propylene, butadiene, styrene, and benzene.

FIG. 2 illustrates a polymerizing apparatus 10 having plasma means for polymerizing the organic compound incorporated in the magnetic layer in a plasma atmosphere. The plasma atmosphere may be created using an inorganic gas such as $H_2$, $O_2$, $N_2$, Ar, He, and Ne, and activating the gas into an electric discharge plasma.

The principle of plasma operation will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. The present invention utilizes this state to effect polymerization by exposing the organic compound incorporated in the magnetic layer to a plasma atmosphere. The use of a low temperature plasma avoids any thermal influence on the substrate and the magnetic layer itself.

Referring to FIG. 2, the plasma polymerizing apparatus 10 includes a reactor vessel R into which a treating gas or gases are introduced from a source 11 and/or 12 through a mass flow controller 13 and/or 14. When desired, different gases from the sources 11 and 12 may be mixed in a mixer 15 to introduce a gas mixture into the reactor vessel. The treating gases may be fed each at a flow rate of 1 to 250 ml per minute.

Disposed in the reactor vessel R is means for supporting the web, in this embodiment, a set of supply and take-up rolls 21 and 20 on which the web is wound. The web is moved from the supply roll 21 to the take-up roll 20 through a plasma region where the organic compound is polymerized within the magnetic layer.

On the opposed sides of the web are located a pair of electrodes 17 and 57, one electrode 17 being connected to a variable frequency power source 16 and the other electrode 57 being grounded at 18.

The reactor vessel R is further connected to a vacuum system for evacuating the vessel, including a liquefied nitrogen trap 111, an oil rotary vacuum pump 112, and a vacuum controller 113. The vacuum system has the capacity of evacuating and keeping the reactor vessel R at a vacuum of 0.01 to 10 Torr.

In operation, the reactor vessel R is first evacuated by means of the vacuum pump to a vacuum of $10^{-3}$ Torr or lower before a treating gas or gases are fed into the vessel at a predetermined flow rate. Then the interior of the reactor vessel is maintained at a vacuum of 0.01 to 10 Torr. A take-up roll motor (not shown) is turned on to transfer the substrate. When the flow rate of the gas mixture and the rate of transfer of the substrate become constant, the variable frequency power 16 is turned on to produce a plasma with which the travelling substrate is plasma treated, that is, the organic compound is plasma polymerized within the magnetic layer.

The treating gases used in the plasma treatment may preferably be hydrogen, oxygen, nitrogen, argon, neon, and helium gases as previously mentioned. They may be generally used alone although a mixture of two or more may be used if desired.

The plasma treatment may be conducted at such parameters as a chamber vacuum of about 0.01 to 10 Torr, a frequency of about 10 KHz to 2 GHz, and a power of about 0.5 to 5 kilowatts. These parameters may be empirically determined for a particular apparatus because they affect the nature of the magnetic layer.

When radiation exposure is used instead of the plasma polymerization mentioned above to carry out polymerization of the organic compound incorporated in the magnetic layer, the apparatus shown in FIG. 2 is replaced by any suitable one of various well-known radiation exposure apparatus. The active energy radiation used in polymerization may be such radiation as electron radiation produced by a radiation accelerator, gamma-rays emitted from a Co60 source, beta-rays emitted from a Sr90 source, x-rays produced by an x-ray generator, and ultraviolet radiation. The use of electron genus from the standpoints of dose control, combination with the manufacturing line, and shielding of ionized radiation.

Preferably radiation is applied so as to provide a dose in the range of 0.5 to 20 Mrad by operating a radiation accelerator at an accelerating voltage of 100 to 750 kilovolts, especially 150 to 300 kilovolts because of penetrating power.

In the practice of polymerization process, a radiation accelerator such as a low dose radiation accelerator of the electro-curtain system as available from Energy Science Corporation of U.S. is advantageous from the standpoints of dose control, combination with the tape manufacturing line, and shielding of secondary radiation within the accelerator. Also useful is a van de Graaf type accelerator which is widely used as a radiation accelerator in the prior art.

It is important in radiation crosslinking to expose the organic compound to radiation in an inert gas stream such as nitrogen and helium gases. Exposure to radiation in air is inconvenient because $O_3$ and other species can be produced by radiation exposure which prevent radicals created in the organic compound from advantageously participating in polymerization reaction. The atmosphere in which the organic compound is exposed to active energy rays should be an inert gas atmosphere of nitrogen, helium, carbon dioxide or the like having an oxygen content of at most 5%.

Polymerization of the organic compound incorporated in the magnetic layer in this way results in a medium which experiences minimized curling or cupping. The medium can thus produce a stable output while exhibiting improved corrosion resistance and runnability.

In another preferred embodiment, a topcoat layer may be formed on the magnetic layer having the organic polymer incorporated therein. The topcoat layer may be selected from various compositions although a polymerized, especially plasma-polymerized, film of an organic compound containing carbon and fluorine and/or hydrogen are preferred because of further improved performance. The organic compound used in the topcoat may be the same as or different from that used in the magnetic layer.

The preferred topcoat layers contain carbon and fluorine and/or hydrogen in an atomic ratio $C/(F+H)$ of 1 to 8. Elemental analysis may be the same as previously described for the magnetic layer. The thickness of the topcoat layer preferably ranges from about 10 to 40 Å.

The topcoat layer, especially in the form of a plasma-polymerized film of an organic compound may be formed on the magnetic layer, for example, by the following procedure.

Where the organic compound incorporated in the magnetic layer is polymerized with the aid of a plasma in the polymerizing apparatus 10 shown in FIG. 2, a plasma treatment may be used wherein an inorganic gas as mentioned above is introduced into the polymerization apparatus and excited under a vacuum into a plasma in which a subject or magnetic layer-bearing substrate is placed. After such a plasma treatment, a plasma-polymerized film may be formed as a topcoat layer. Also a plasma-initiated polymerization process may be used which involves passing a subject through a plasma atmosphere of hydrogen, nitrogen, oxygen, argon or the like to create radical ions on the subject surface and thereafter, supplying an organic compound gas to form a polymerized film thereof. Alternatively, it is possible to incorporate an organic compound into the magnetic layer and then pass the layer through a plasma polymerizing atmosphere whereupon polymerization of the organic compound in the magnetic layer and formation of a topcoat film are accomplished simultaneously. These processes can either sequentially or simultaneously polymerize the organic monomer incorporated in the magnetic layer during magnetic layer formation and form a polymerized film of a separately fed organic monomer on the magnetic layer.

It is also contemplated that the organic compound incorporated in the magnetic layer during its formation in an evaporation apparatus as shown in FIG. 1 is polymerized with radiation in a polymerizing apparatus (not shown) and then a plasma-polymerized film is formed as a topcoat on the magnetic layer in a plasma-polymerizing apparatus as shown in FIG. 2.

The above-described formation and treatment of the magnetic layer and topcoat may be carried out either continuously or batchwise for each step as well as for the entire process of combined steps.

When a plasma-polymerized film is formed from an organic compound as a topcoat on the magnetic layer at the end of polymerization of the organic compound incorporated in the magnetic layer, the organic compounds used for the formation of the topcoat may be selected from those incorporated in the magnetic layer, that is, groups (A) to (D). Among them most useful are those having 1 to 3 carbon atoms.

The conditions for plasma polymerization may be similar to those previously described for the plasma treatment.

The substrates used herein are not particularly limited as long as they are nonmagnetic. Particularly preferred are flexible substrates, especially of resins, for example, polypropylene, polyesters such as polyethylene terephthalate, and polyimides. They are not limited in shape, size, and thickness as long as they meet the intended application. Preferably, the flexible substrates have a thickness of about 5 to 20 μm.

Any of various well-known backcoat layers may be formed on that surface of the substrate remote from the magnetic layer.

As described above, the magnetic recording medium comprising a magnetic layer having an organic polymer incorporated therein and optionally, a topcoat layer is substantially free of curling or cupping and exhibits improved output stability, corrosion resistance, and runnability. The magnetic recording medium of the present invention thus finds utility in video, audio, computer and other applications.

EXAMPLES

Examples of the present invention are given by way of illustration and not by way of limitation.

EXAMPLE 1

Using a cobalt-nickel alloy having a Co/Ni weight ratio of 4/1, a magnetic layer of 0.2 μm thick was deposited on a polyethylene terephthalate (PET) web of 10 μm thick by the oblique evaporation process. The PET web was moved along a cooling drum in a vacuum vessel where the alloy was evaporated by means of an electron beam gun. The process used an atmosphere consisting of argon at a partial pressure of $2 \times 10^{-2}$ Pa and oxygen at a partial pressure of $1 \times 10^{-2}$ Pa while the incident angle varied in the range of 90° to 30°. During the process, a gaseous organic compound as reported in Table 1 was introduced into the vacuum vessel at a predetermined flow rate. The resulting magnetic layer had the organic compound incorporated therein.

The web carrying the magnetic layer was then passed through a plasma treating vacuum vessel to polymerize the organic compound within the magnetic layer. In the plasma treating vacuum vessel set to a vacuum of 0.01

Torr, argon was activated into a plasma by applying electricity at RF 13.56 MHz and 500 watts.

A series of samples were prepared by the above procedures as reported in Table 1. They were measured for the following properties.

Average C/Co ratio in magnetic layer

The profile of the composition of the layer in a thickness direction was determined by Auger spectroscopy or SIMS with concurrent ion etching The average C/Co atom ratio in the magnetic layer was calculated from the profile. A reference sample, cobalt carbide $Co_2C$ was similarly measured to determine a measurement sensitivity.

$$C/Co = \frac{(\text{Count of C}) \times (\text{measurement sensitivity of C})}{(\text{Count of Co}) \times (\text{measurement sensitivity of Co})}$$

Cupping

A sample was sliced to the width of ½" to measure the cupping height.

Corrosion resistance ($\Delta\phi m/\phi m$)

A tape sample was measured for magnetic flux quantity both at the initial and after it was allowed to stand for 7 days at 60° C. and a relative humidity of 90%. A percent reduction in magnetic flux quantity ($\Delta\phi m/\phi m$, %) per square centimeter was determined.

Runnability

A commercial VHS video deck was loaded and operated with a tape sample. Using a signal of 4 MHz, a reduction (dB) in output after 50 passes was determined.

The results are shown in Table 1.

TABLE 1

| Sample No. | Organic compound Type | Flow rate | C/Co | Cupping height | Corrosion $\Delta\phi m/\phi m$ |
| --- | --- | --- | --- | --- | --- |
| 101 | $C_2H_4$ | 100 SCCM | $\sim 10^{-5}$ | 0.25 mm | 4.5% |
| 102 | $C_2H_4$ | 20 SCCM | $\sim 10^{-7}$ | 0.30 mm | 5.5% |
| 103* | — | — | — | 1.1 mm | 12.0% |

*comparison

EXAMPLE 2

A magnetic layer having an organic compound introduced therein as reported in Table 2 was formed by substantially repeating the procedures of Example 1. A plasma-polymerized film was further formed on the magnetic layer. The organic compounds used in gas form to form plasma-polymerized films are reported in Table 2. The plasma polymerizing conditions were the same as described for the plasma treatment of the magnetic layer in Example 1. Formation of the topcoat film by plasma polymerization was accomplished at the same time as polymerization of the organic compound in the magnetic layer.

A series of samples were prepared and measured for the same properties as in Example 1.

The results are shown in Table 2.

TABLE 2

| Sample No. | Organic compound introduced during magnetic layer formation | | C/Co | Organic compound introduced for plasma polymerization | |
| --- | --- | --- | --- | --- | --- |
| | Type | Flow rate | | Type | Flow rate |
| 201 | $CH_4$ | 200 SCCM | $\sim 10^{-5}$ | $CH_4$ | 150 SCCM |
| 202 | $C_2H_6$ | 100 SCCM | $\sim 10^{-6}$ | $CH_4$ | 150 SCCM |
| 203 | $C_3H_8$ | 75 SCCM | $\sim 10^{-5}$ | $CHF_3$ | 150 SCCM |
| 204 | $C_2H_2$ | 2 SCCM | $<10^{-8}$ | $CHF_3$ | 150 SCCM |
| 205 | $C_2H_6$ | 5 SCCM | $<10^{-8}$ | $CH_4$ | 150 SCCM |
| 206* | — | — | — | $CH_4$ | 100 SCCM |
| 207* | — | — | — | $CH_4$ | 150 SCCM |

| Sample No. | Plasma-polymerized film thickness, Å | Cupping height, mm | Corrosion resistance $\Delta\phi m/\phi m$, % |
| --- | --- | --- | --- |
| 201 | 20 | <0.1 | 2.0 |
| 202 | 20 | <0.1 | 2.5 |
| 203 | 15 | <0.1 | 1.5 |
| 204 | 25 | <0.35 | 5.0 |
| 205 | 30 | <0.37 | 6.0 |
| 206* | 15 | 0.4 | 8.0 |
| 207* | 20 | 0.4 | 8.0 |

*comparison

We claim:

1. A method for preparing a magnetic recording medium comprising a substrate, a metal thin-film magnetic layer on the substrate, and a topcoat layer on the magnetic layer, said method comprising the steps of
   forming the magnetic layer while incorporating a first organic compound therein from a gas phase,
   deposition a second organic compound on the magnetic layer, and
   polymerizing the organic compounds in a plasma atmosphere, wherein said magnetic layer contains cobalt in an atomic composition ratio of carbon to cobalt from $1 \times 10^{-8}:1$ to $1 \times 10^{-2}:1$.

2. The method of claim 1 wherein the first and second compounds are the same.

3. The method of claim 1 wherein the first and second compounds are different.

4. The method of claim 1 wherein the first and second organic compounds are simultaneously polymerized.

5. The method of claim 1 wherein the step of polymerizing the first compound is separate from the step of polymerizing the second compound.

6. A magnetic recording medium comprising a substrate and a metal thin-film magnetic layer on the substrate,
   wherein said magnetic layer contains a polymeric organic compound and cobalt in an atomic composition ratio of carbon to cobalt of from $1 \times 10^{-8}:1$ to $1 \times 10^{-2}:1$,
   wherein the medium is prepared by forming the magnetic layer while incorporating an organic compound therein from a gas phase and polymerizing the organic compound in a plasma atmosphere.

7. The magnetic recording medium of claim 6 which further comprises a topcoat layer on said magnetic layer.

8. The magnetic recording medium of claim 6 wherein the organic compound is incorporated in the magnetic layer before the compound is polymerized.

* * * * *